United States Patent
Allarey et al.

(10) Patent No.: US 7,650,518 B2
(45) Date of Patent: Jan. 19, 2010

(54) METHOD, APPARATUS, AND SYSTEM FOR INCREASING SINGLE CORE PERFORMANCE IN A MULTI-CORE MICROPROCESSOR

(75) Inventors: Jose Allarey, Davis, CA (US); Varghese George, Folsom, CA (US); Sanjeev Jahagirdar, Folsom, CA (US); Oren Lamdan, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 555 days.

(21) Appl. No.: 11/477,751

(22) Filed: Jun. 28, 2006

(65) Prior Publication Data

US 2008/0005592 A1    Jan. 3, 2008

(51) Int. Cl.
G06F 1/00 (2006.01)
G06F 1/32 (2006.01)
(52) U.S. Cl. ............ 713/300; 713/320; 713/330
(58) Field of Classification Search ........ 713/300, 713/320, 330; 702/188
See application file for complete search history.

(56) References Cited

U.S. PATENT DOCUMENTS

| 6,556,160 B1 * | 4/2003 | Kamel et al. ............ 341/143 |
| 6,804,632 B2 * | 10/2004 | Orenstien et al. ............ 702/188 |
| 2002/0133729 A1 * | 9/2002 | Therien et al. ............ 713/330 |
| 2002/0194509 A1 * | 12/2002 | Plante et al. ............ 713/300 |
| 2004/0071184 A1 | 4/2004 | Naveh et al. |
| 2005/0289365 A1 * | 12/2005 | Bhandarkar ............ 713/300 |
| 2006/0026447 A1 | 2/2006 | Naveh et al. |
| 2006/0053326 A1 | 3/2006 | Naveh et al. |
| 2006/0149975 A1 * | 7/2006 | Rotem et al. ............ 713/300 |
| 2007/0033425 A1 * | 2/2007 | Clark ............ 713/320 |

* cited by examiner

*Primary Examiner*—Thomas Lee
*Assistant Examiner*—Vincent T Tran
(74) *Attorney, Agent, or Firm*—Kacvinsky LLC (57) ABSTRACT

A method, system, and apparatus to enable at least one active core in a multi-core processor to operate at a higher operating point while at least one other core in the multi-core processor is in an idle state. When the idle core exits the idle state, the operating point may be reduced after a hysteresis timer has expired.

17 Claims, 7 Drawing Sheets

METHOD, APPARATUS, AND SYSTEM FOR INCREASING SINGLE CORE PERFORMANCE IN A MULTI-CORE MICROPROCESSOR

BACKGROUND

Embodiments of the present invention relate to thermal management of microprocessors and more specifically to using turbo mode to increase the frequency of one or more cores in a microprocessor.

In a multi-core microprocessor, it may be desirable to allow the cores to use available power headroom to maximize performance. In such instances, the cores may operate at frequencies and/or voltages above those specified by the manufacturer. Thermal throttling may then be used to reduce the operating frequency and/or voltage of the cores when a target temperature is reached or exceeded.

However, thermal throttling may not occur in some environments, such as where the ambient temperature is sufficiently low. In such an environment, there is no mechanism available to reduce the operating frequency and/or voltage, and the processor will be permitted to run at a frequency/voltage greater than specified by the manufacturer for an indefinite amount of time. In this case, the power delivery system must be over-designed in order to supply the additional power required for the system.

BRIEF DESCRIPTION OF THE DRAWINGS

A better understanding of the present invention can be obtained from the following detailed description in conjunction with the following drawings, in which.

DETAILED DESCRIPTION

In the following description, for purposes of explanation, numerous details are set forth in order to provide a thorough understanding of embodiments of the present invention. However, it will be apparent to one skilled in the art that these specific details are not required in order to practice the present invention as hereinafter claimed.

Embodiments of the present invention concern the use of turbo mode in multi-core microprocessors. Although the following discussion centers on dual core processor implementations, it will be understood by those skilled in the art that the present invention as hereinafter claimed may be practiced in support of a multi-core processor having more than two cores as well.

As used herein, "single core turbo mode" is an operational mode of a multi-core microprocessor. When a multi-core microprocessor is in single core turbo mode, the multi-core processor may operate at a higher operating point, and thus, at least one core may run at a higher operational frequency and/or voltage only as long as at least one core remains idle. Thus, in single core turbo mode, the power and thermal headroom of one or more idle cores may be used to increase the operational frequency of one or more cores that are not idle.

Figure 1:
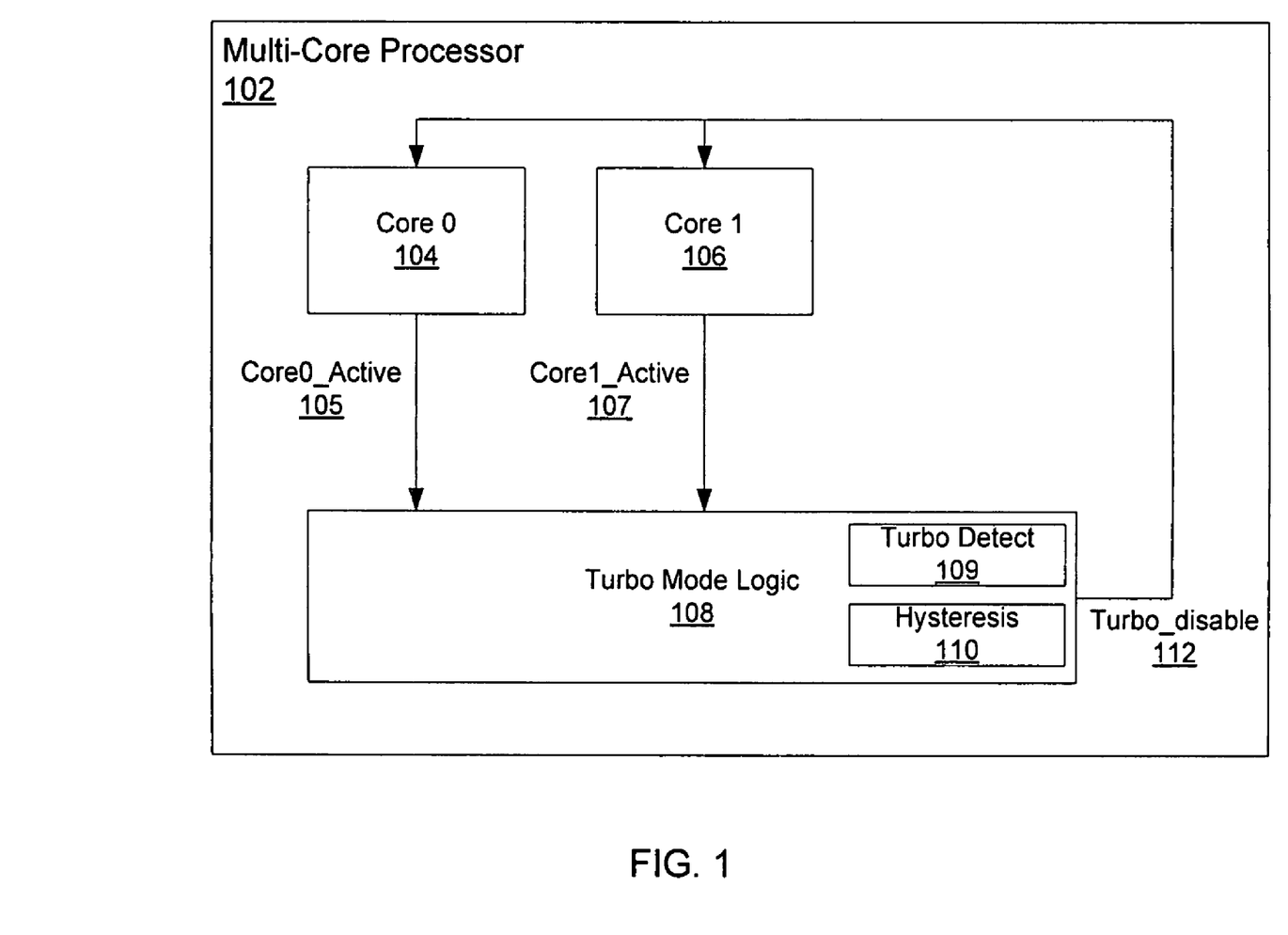
FIG. 1 is an illustration of a multi-core microprocessor according to some embodiments.

FIG. 1 illustrates a multi-core microprocessor (102) including single core turbo mode logic (108) according to some embodiments. Multi-core processor (102) includes a plurality of processing cores, Core 0 (104) and Core 1 (106). In other embodiments, the processor may include additional cores as well.

Each core may generate a core active signal indicating whether the core is in an active state or an idle state, Core0_Active (105) and Core1_Active (107). The core active signal may be generated by each core, as shown, or may be generated by another logic unit within the processor. Alternately, the core active signal may be generated by software or firmware.

In various embodiments, any core state in which snoops are ignored may be considered to be an idle state, if the core's clock grid is also disabled. When an idle core is in one of the CC3, CC4, or CC6 states, snoops from an active core will not wake up the idle core. Therefore, the CC3, CC4, and CC6 states may be considered to be idle states. Thus, in some embodiments, a core is considered idle if its clock grid is not enabled, and if the core is in a state in which snoops are ignored (e.g., CC3, CC4, or CC6). This definition of an idle state minimizes the power consumed by the idle core and also ensures that an idle core won't be woken up by an active core for snoops.

In some embodiments, a core is considered active if its clock grid is enabled, or if the core is any state in which snoops are not ignored. Thus, if a core's clock grid is enabled or if it is not in the CC3, CC4, or CC6 state, the core may be considered to be active. In general, a core in an active state is a core that is not in an idle state.

The processor (102) also includes turbo mode logic (108). The turbo mode logic will detect the active or idle status of each core, and may include turbo detect logic (109). When one core is active and another is idle, the turbo mode logic may enable turbo mode for the active core while the idle core remains idle. When turbo mode is enabled for a single core, the power and/or frequency of that core may be increased beyond the specified design limits. By increasing the operating point of an active core while another core is idle, the power and thermal headroom of the idle core can be used by the active core.

When the idle core wakes up from its idle state, the turbo mode logic will disengage turbo mode. In some embodiments, the turbo mode logic will disengage turbo mode only after a short delay period, or hysteresis period, after the idle core wakes up. The hysteresis delay avoids frequent transitions in and out of turbo mode in situations where the idle core wakes up periodically for a very brief time. Frequent transitions in and out of turbo mode may result in performance degradation due to the overhead of the transitions. This overhead may be in the form of dead time, in which the processor may stop operating in order to allow the frequency of one or more cores to change.

The hysteresis delay may be implemented by a hysteresis logic block (110) within the turbo mode logic. The hysteresis delay is used to ensure that the active core does not enter and exit turbo mode more often than necessary. For example, if the idle core wakes up for short periods, such as 50 microseconds, and then goes back into an idle state, it may not be necessary for the active core to disengage from turbo mode because 50 microseconds may not be a thermally significant time period. Thus, for non-thermally significant time periods, it is possible for two cores to be active at the same time. However, if the idle core wakes up for a longer period of time, such as a period of time that will enable the core to have a thermal effect on the microprocessor, the hysteresis mechanism will expire, thus disengaging turbo mode for the active core and allowing the processor to stay under the average thermal design power specification.

The turbo mode logic (108) may further include additional logic gates and/or logic blocks not illustrated in FIG. 1.

Figure 2:
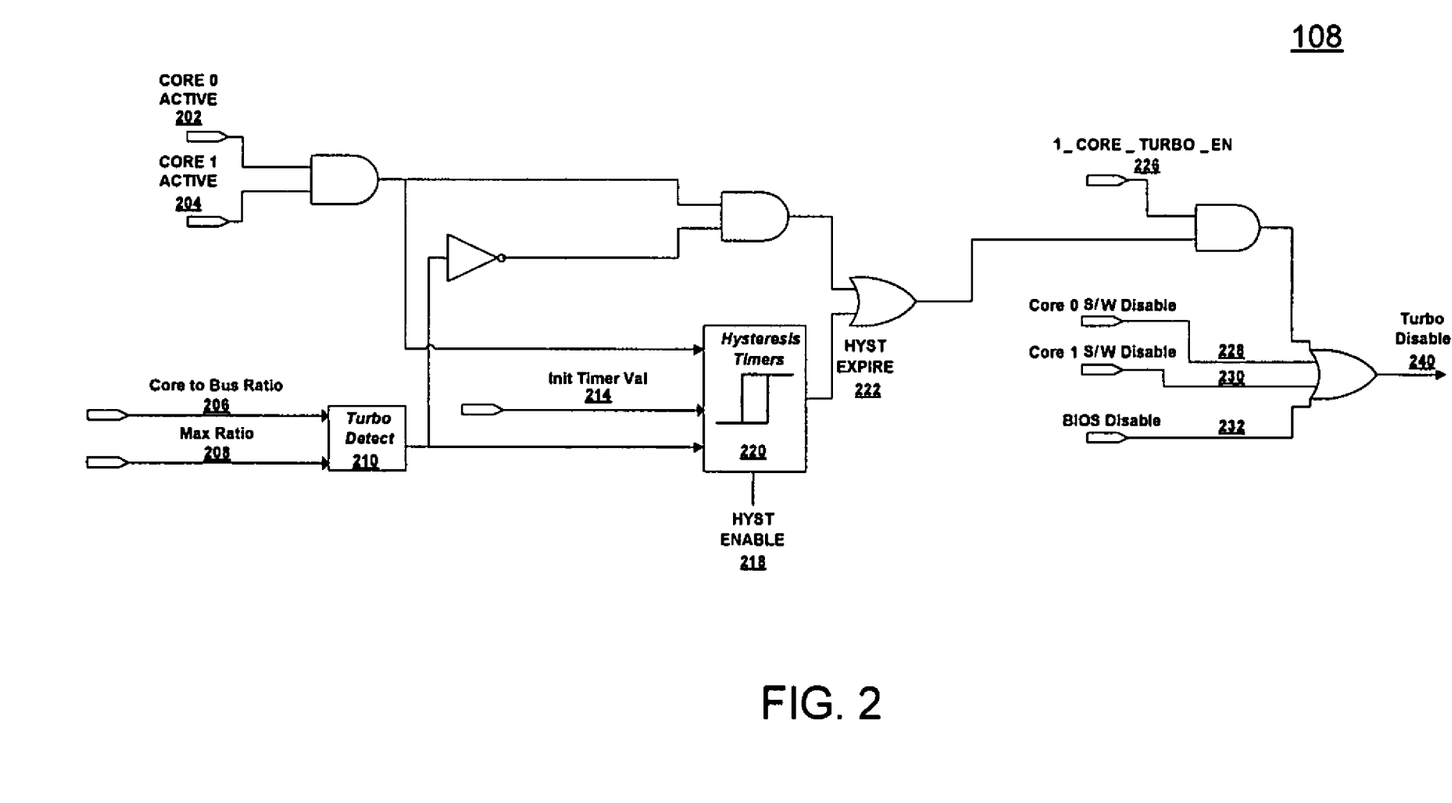
FIG. 2 is an illustration of turbo mode disable logic according to some embodiments.

FIG. 2 illustrates the turbo mode logic (108) of FIG. 1 in more detail, according to some embodiments. It should be noted that other implementations of the turbo mode logic may be possible as well, including different hardware implementations, as well as firmware or software implementations.

According to some embodiments, single core turbo mode is enabled for the processor when the 1_CORE_TURBO_EN signal (226) is asserted. Single core turbo mode may be enabled or disabled via a fuse, or may be dynamically enabled or disabled via software, firmware, or hardware. When single core turbo mode is enabled, at least one processing core may be allowed to operate at higher operational frequencies. When the processor is operating in single core turbo mode, turbo mode for one or more cores within the processor may be disabled by the logic circuitry of FIG. 2 only in certain instances.

For example, turbo mode will be disabled via the Turbo Disable signal (240) when the Core 0 Active and Core 1 Active signals (202, 204) indicate that both cores are active and when hysteresis (220) is disabled by the hysteresis enable signal (218). In this scenario, turbo mode will be disabled based on core state alone.

Turbo mode may also be disabled (240) when both cores are active (202, 204) and when the hysteresis mechanism (220) has expired (222).

The hysteresis mechanism (220) may include one or more timers, which in some embodiments may be programmable timers, such as timers that may be programmed via a microcode patch. The timers may be programmed with an initial value (214).

The hysteresis mechanism (220) limits the amount of time that the processor is running with two cores active while in turbo mode. For example, it prevents a core that is in turbo mode from immediately exiting turbo mode when the idle core wakes up for short durations. It may also disable turbo mode even though the idle core wakes up only for short durations, if the interval between wakeup events is sufficiently small. The hysteresis mechanism is discussed in more detail below, in conjunction with FIG. 3.

The turbo mode logic (108) may also include turbo detect logic (210). The turbo detect logic (210) determines whether one core is operating in turbo mode. If the turbo detect logic indicates that turbo mode is not presently engaged, turbo mode may be engaged if a core is in an idle state. If the turbo detect logic indicates that turbo mode is engaged, the hysteresis mechanism (220) will limit the amount of time that the processor is running with two cores active while in turbo mode.

In some embodiments, the turbo detect logic (210) may compare the current core to bus clock ratio (206) against a maximum ratio (208). It may also determine if the maximum ratio is a turbo mode ratio or a ratio that is guaranteed by the processor's specifications.

Finally, turbo mode may be disabled (240) if any turbo disable signals are asserted. These signals may include, but are not limited to, software disables for each core (228, 230), or a BIOS disable signal (232).

Figure 3:
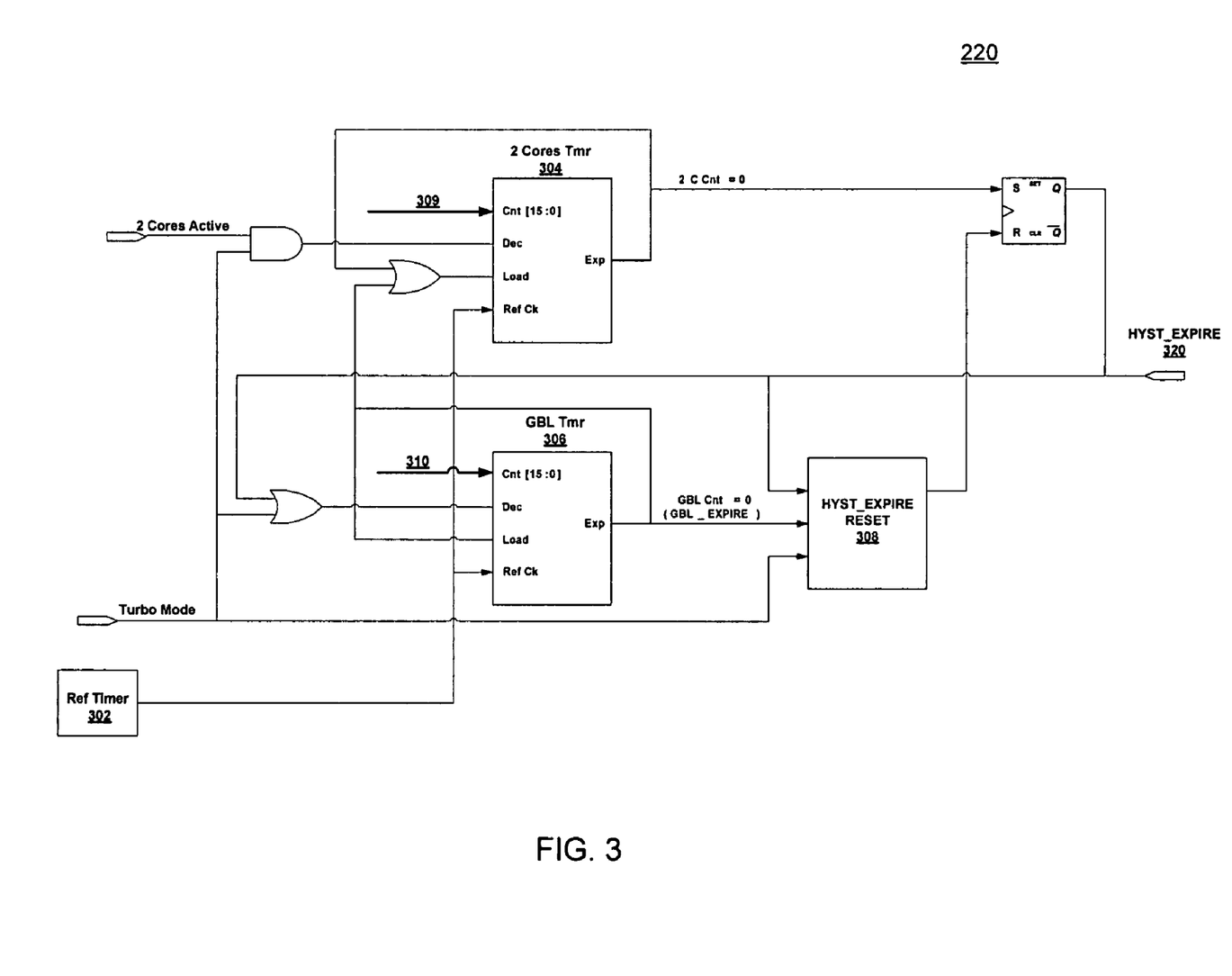
FIG. 3 is an illustration of hysteresis timer logic according to some embodiments.

FIG. 3 is an illustration of the hysteresis mechanism (220) according to some embodiments. The hysteresis mechanism may be implemented using two programmable timers (304, 306), and a reference timer (302). The reference timer (302) may be a 1 microsecond reference timer.

Both timers (304, 306) update each time the reference timer (302) updates, or, in some embodiments, every 1.0 microseconds. The use of the reference timer (302) allows the timers to synchronize their counts.

One programmable timer (304) is a timer that decrements while two cores are active during turbo mode. The two cores active timer tracks the total time that both cores are active, $t_{on}$. In some embodiments, this timer may be programmed with an initial value (309) of $(t_{on}/2)/1.0$ microseconds.

The other programmable timer (306) is a global timer that decrements while the processor is in turbo mode or while the HYST_EXPIRE signal (320) is asserted. The global timer tracks the total time that the processor is in turbo mode, T, where T is equal to the time that both cores are active ($t_{on}$) plus the time that at least one core is idle ($t_{off}$). The global timer may be programmed with an initial value (310) of T/1.0 microseconds.

In some embodiments, both timers may be disabled by setting their respective expiration counts to 0x0. If the two cores active timer (304) is disabled, the HYST_EXPIRE signal (320) will always be asserted, thereby disabling turbo mode. If only the global timer (306) is disabled, the both cores active timer will always be reset, and the HYST_EXPIRE signal (320) will never be asserted, except when the both cores active timer (304) is also disabled.

If the global timer (306) expires before the two cores active timer (304), both timers may be reset.

If the two cores active timer (304) expires before the global timer (306), or if both timers expire at the same time, the HYST_EXPIRE signal will be asserted, thus disabling turbo mode. Reset logic (308) prevents turbo mode from re-engaging until after at least one global timer period has passed after exiting turbo mode.

Both timers in the hysteresis mechanism (304, 308) may be reset when the processor undergoes a reset and upon entering turbo mode.

FIGS. 4-6B are graphs which illustrate the operation of the hysteresis mechanism.

Figure 4:
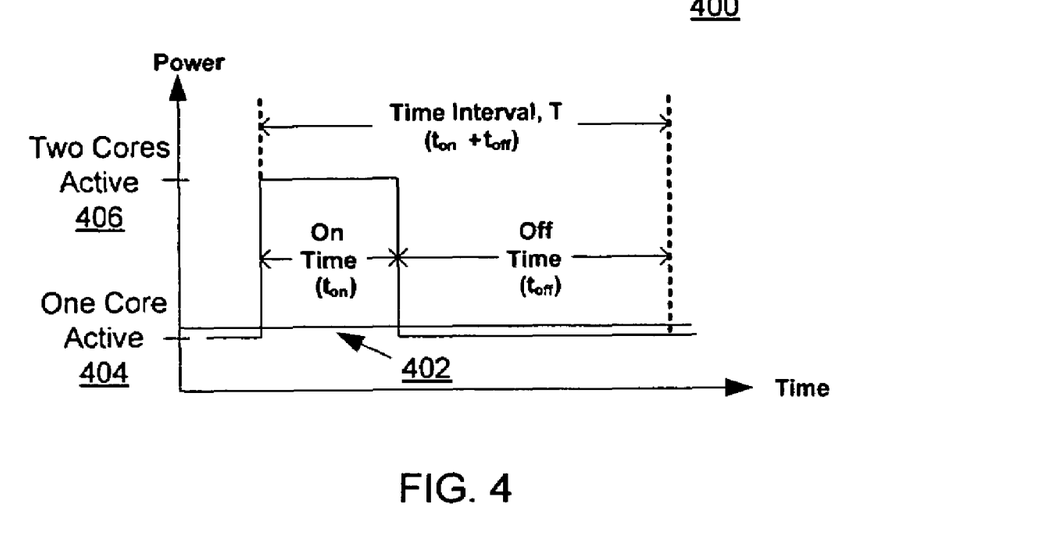
FIG. 4 is a graph comparing single core power in turbo mode to multi core power in turbo mode according to some embodiments.

FIG. 4 is a graph (400) which illustrates how hysteresis limit values are set. A guaranteed thermal design power limit (402) may be specified in a processor platform design specification. During normal processor operations, the thermal design power may not exceed this specified limit. When the processor is operating in single core turbo mode, as described above, the active core may operate at a higher than guaranteed frequency, using the power headroom of the idle core to achieve a power level that remains within the specified limits (404). However, when the idle core becomes active while the processor is in single core turbo mode, the thermal design power limit may be exceeded (406) because one core is operating at a higher than guaranteed frequency and/or voltage while the second core has no available power headroom.

The maximum total time for which the two cores may be active ($t_{on}$) and the time period for which at least one core may be idle ($t_{off}$) in a time interval, T, where $T=t_{on}+t_{off}$, while the processor is in turbo mode may be predetermined, and can specified by platform design specifications. These values may be programmed into hysteresis timers, as illustrated in FIG. 3 and discussed above. Thus, if two cores are active for a period of longer than $t_{on}$ in a given, predetermined time interval $T=t_{on}+t_{off}$, while the processor is in turbo mode, the hysteresis timers will expire, and turbo mode is disabled.

Figure 5:
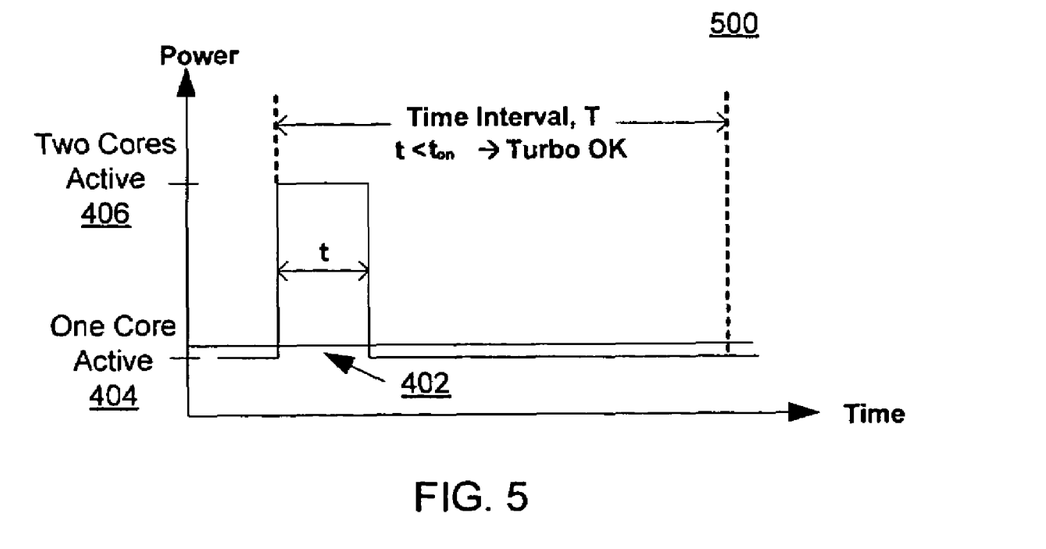
FIG. 5 is a graph illustrating how average power may be kept below a threshold level by limiting the time that two cores are active while in turbo mode according to some embodiments.

FIG. 5 is a graph (500) which illustrates a scenario where turbo mode need not be disabled when two cores are active. Here, the processor is in single core turbo mode, and the idle core becomes active for a period, t, within time interval T, where t is less than specified time period $t_{on}$. Any period, t, that is less than $t_{on}$ may be deemed a thermally insignificant period of time. Thus, there will be a negligible thermal impact on the system, and turbo mode will not be disabled even though two cores are active for a period $t<t_{on}$.

Figure 6A:
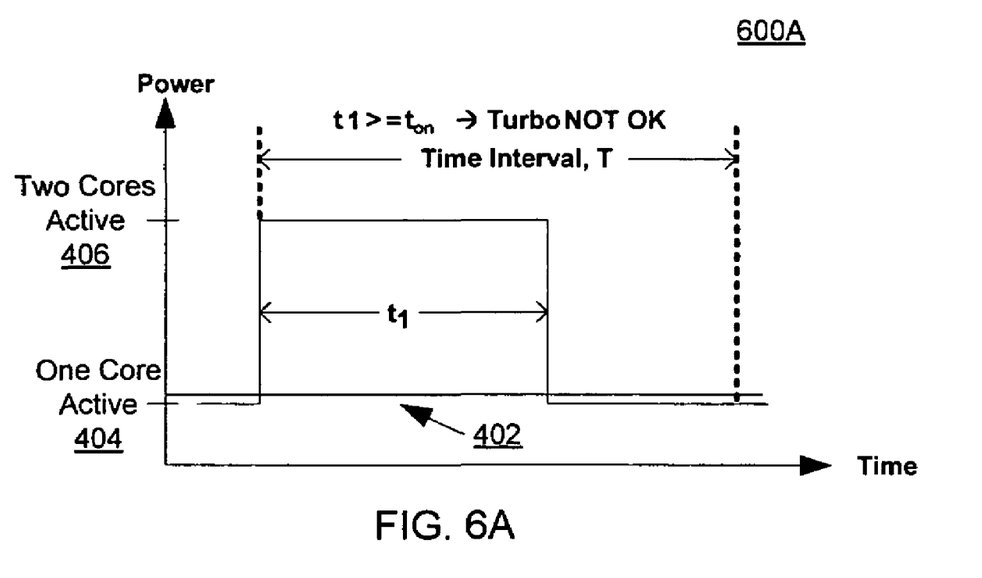
FIGS. 6A and 6B are graphs illustrating scenarios where the average power over a time interval may exceed a threshold level when two cores are active while in turbo mode according to some embodiments.
Figure 6B:
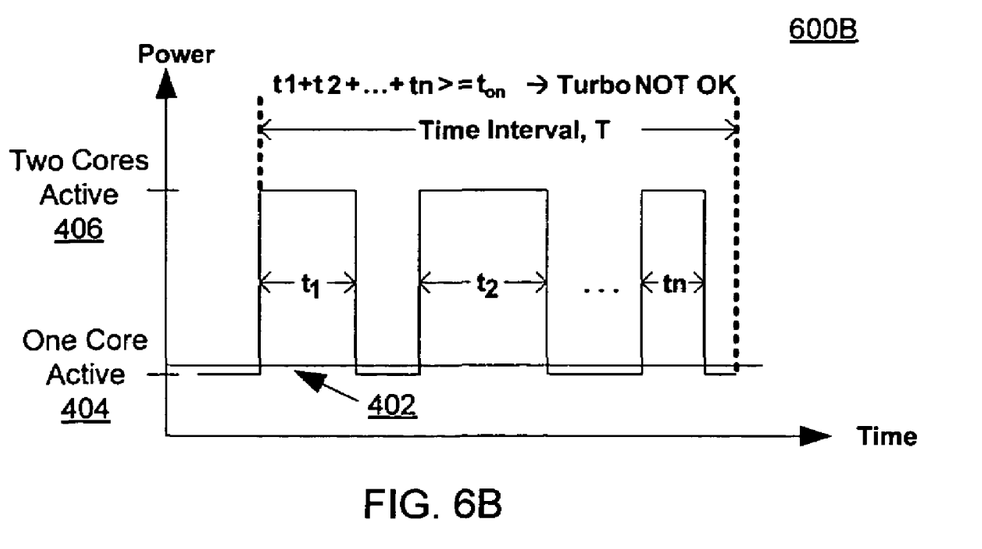

FIGS. 6A and 6B are graphs (600A, 600B) which illustrate scenarios where turbo mode may be disabled.

In FIG. 6A, two cores are active for a time period, $t_1$, where $t_1$ is greater than or equal to $t_{on}$, while the processor is in turbo mode. Here, the idle core wakes up and is active for a prolonged period, $t_1$, that is greater than or equal to the specified maximum time period $t_{on}$.

In FIG. 6B, two cores are active for multiple short periods within time interval T while the processor is in turbo mode. The cumulative total of these short periods of two core activity, $t_1+t_2+\ldots+t_n \geq t_{on}$. In this case, turbo mode may be disabled.

In the scenarios illustrated by FIGS. 6A and 6B, the hysteresis mechanism described above will expire, and turbo mode will be disabled.

Figure 7:
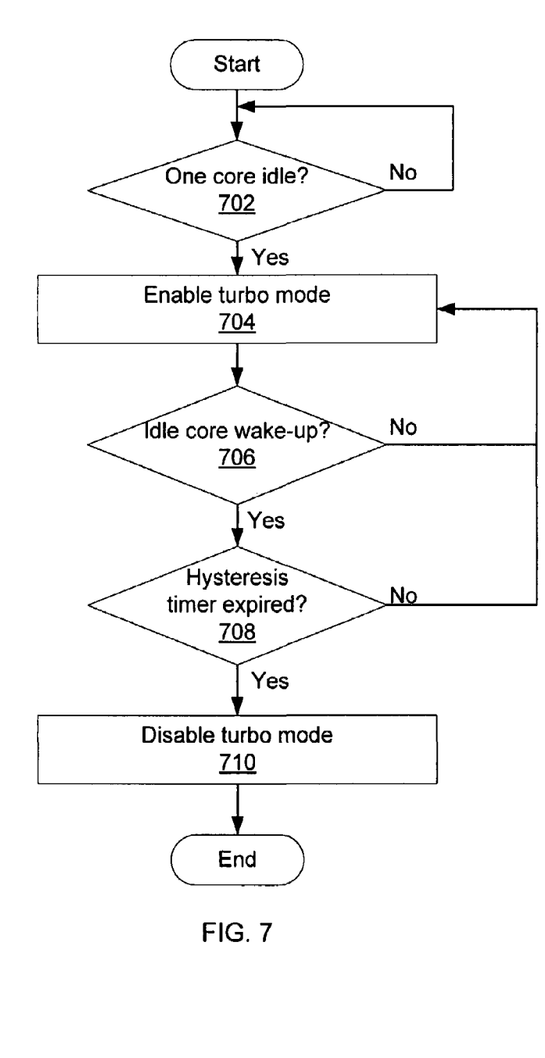
FIG. 7 is an illustration of a flow diagram according to some embodiments.

FIG. 7 is a flow diagram according to some embodiments. If at least one core in a multi-core processor is idle, as shown in block 702, turbo mode may be enabled, as shown in block 704. A core may be considered idle based on its microarchitectural state. In some embodiments, a core is idle if its clock grid is disabled, and if it is in a state in which snoops are ignored (e.g., CC3, CC4, or CC6 states).

In some embodiments, when turbo mode is enabled (704), the operating point (e.g., frequency and/or voltage) of one or more cores in a multi-core processor may be increased to an operating point that is greater than the specified non-turbo mode operating point.

Logic may detect when an idle core wakes up, exiting from the idle state (706). In some embodiments, this will occur when the idle core changes microarchitectural state, such as entering a state in which snoops are not ignored. In some embodiments, an idle core wakeup will be detected if the idle core's clock grid becomes enabled. If the idle core remains idle, and does not wake up (706), turbo mode will remain enabled (704). However, if the idle core becomes active while turbo mode is enabled, the hysteresis timers will begin to track the total time that both cores are active (708).

As long as the hysteresis mechanism does not expire (508), turbo mode will remain enabled. When the hysteresis mechanism expires, turbo mode is disabled (710). In some embodiments, disabling turbo mode decreases the operating point (operating frequency and/or operating voltage) of the active core by decreasing the operating point of the multi-core processor.

Figure 8:
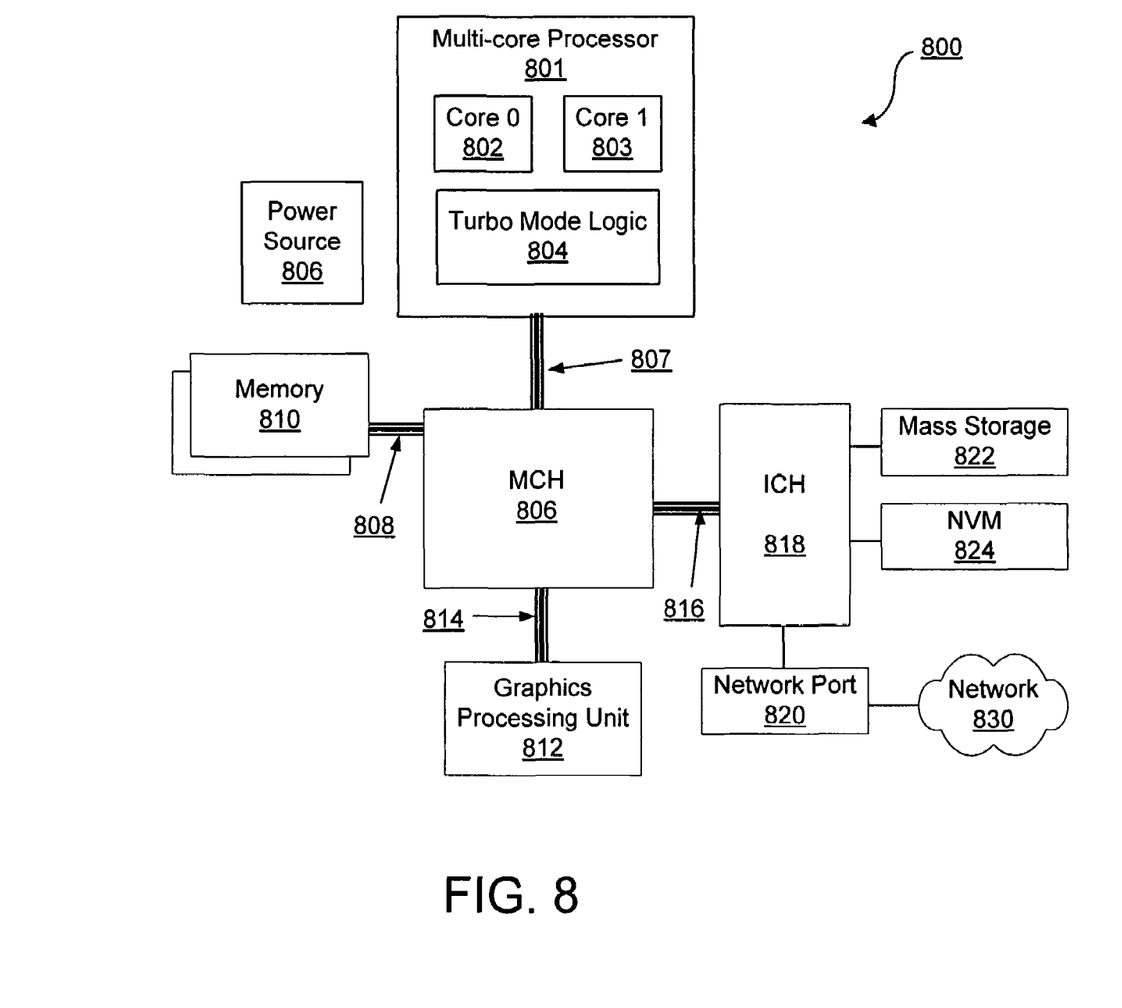
FIG. 8 is an illustration of a system according to some embodiments.

FIG. 8 illustrates a system block diagram according to some embodiments. The system (800) includes at least a multi-core processor or CPU (801), memory controller device (806), I/O controller device (818), and one or more memory devices (810). Note that in some embodiments, the memory controller device and/or the I/O controller device may be integrated into the CPU/processor (801).

The multi-core processor (801) includes at least two cores, Core 0 (802) and Core 1 (803). In some embodiments, the processor (801) may include additional cores. In embodiments including more than two cores, only one core may be allowed to operate in turbo mode while at least one core is idle, or, multiple cores may be allowed to operate in turbo mode while multiple cores remain idle.

The processor (801) also includes turbo mode logic (804), as described above in conjunction with FIGS. 1-7, to allow at least one core of the processor to operate at a higher than guaranteed frequency while at least one core of the processor is idle. Thus, available power and thermal headroom may be used by one core to increase or maximize the overall performance of the system when another core is idle.

The system may also include a network port or interface (820), and may be capable of being coupled to a wired or wireless network (830). The memory controller device (806) is coupled to the CPU (801) by a bus (807). The memory controller device (806) provides the CPU (801) with access to one or more memory devices (810), to which the memory controller device (806) is coupled by a memory bus (808).

A graphics processing unit (812) may be coupled to the memory controller device via a bus (814). An I/O controller device (818) may be coupled to the memory controller device (806) by a bus (816). The I/O controller device (818) may be coupled to a network port (820), capable of connecting to a network (830). The I/O controller device (818) may also be coupled to a mass storage device (822) and/or non-volatile memory (824). A battery or other power supply (806) may provide power to the system.

Together, these components form a system (800) that is capable of supporting the execution of machine readable instructions by CPU (801), and the storage of data, including instructions, within memory devices (810).

Thus, a method, apparatus, and system for increasing single core performance in a multi-core processor are disclosed. In the above description, numerous specific details are set forth. However, it is understood that embodiments may be practiced without these specific details. In other instances, well-known circuits, structures, and techniques have not been shown in detail in order not to obscure the understanding of this description. Embodiments have been described with reference to specific exemplary embodiments thereof. It will, however, be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. A method comprising:
   determining if a first core in a multi-core processor is in an idle state, and if so, increasing an operating point of a second core in the multi-core processor;
   detecting when the first core exits the idle state;
   waiting for a hysteresis timer mechanism to expire after the first core exits the idle state and both the first and second cores are in an active state; and
   decreasing an operating point of the second core when the hysteresis timer mechanism expires and both the first and second cores are in an active state.

2. The method of claim 1, wherein said determining if the first core is in an idle state comprises determining a microarchitectural state of the first core.

3. The method of claim 2, wherein said determining that the first core is in the microarchitectural state comprises determining that the first core is one of a group comprising CC3, CC4, and CC6 states.

4. The method of claim 1, wherein said determining if the first core is in an idle state comprises determining that the first core has a disabled clock grid and that the first core is in a state in which snoops are ignored.

5. The method of claim 1, wherein said detecting when the first core exits the idle state comprises determining a microarchitectural state of the first core.

6. The method of claim 1, wherein said detecting when the first core exits the idle state comprises determining whether the first core has a clock grid enabled.

7. The method of claim 1, wherein the hysteresis timer mechanism is programmable.

8. The method of claim 7, wherein the hysteresis timer mechanism includes at least one programmable timer.

9. The method of claim 1, wherein said decreasing the operating point of the second core when the hysteresis timer mechanism expires comprises decreasing an operating point of the multi-core processor.

10. The method of claim 9, wherein said decreasing the operating point of the multi-core processor comprises decreasing the operational frequency of the multi-core processor.

11. The method of claim 10, wherein said decreasing the operating point of the multi-core processor further comprises decreasing the operational voltage of the multi-core processor.

12. A microprocessor comprising:
a first core;
a second core; and
turbo mode logic coupled to the first core and the second core, the turbo mode logic to enable turbo mode for the first core when the second core is in an idle state, wherein the turbo mode logic includes a hysteresis mechanism to expire when the first core is in an active state and the second core is an active state for a predetermined amount of time, the turbo mode logic to disable turbo mode when the first core is in an active state, the second core is in an active state, and the hysteresis mechanism has expired.

13. The microprocessor of claim 12, wherein the hysteresis mechanism includes at least one programmable timer.

14. The microprocessor of claim 12, further comprising mode detection logic coupled to the first core and the second core, the mode detection logic to determine when one of the first core and the second core is operating in a turbo mode.

15. A system comprising:
a multi-core processor including at least first core, a second core, and turbo mode logic coupled to the first core and the second core, the logic to enable the first core to operate at an increased operational frequency when the second core is in an idle state;
a memory controller device coupled to the processor; and
a power source to provide power to the processor and the memory controller device;
wherein the multi-core processor further includes a hysteresis mechanism to expire when the first core is operating at an increased operational frequency and when the second core is an active state for a predetermined amount of time, the logic of the multi-core processor to decrease the operational frequency of the first core when the first core is in an active state, the second core is in an active state, and the hysteresis mechanism has expired.

16. The system of claim 15, wherein the multi-core processor further includes mode detection logic coupled to the first core and the second core to determine when at least one of the first core and the second core is operating at the increased operational frequency.

17. The system of claim 15, wherein the hysteresis mechanism includes at least one programmable timer.

* * * * *